(12) United States Patent
Larsson et al.

(10) Patent No.: US 6,672,421 B2
(45) Date of Patent: Jan. 6, 2004

(54) MOTOR VEHICLE ARRANGEMENT

(75) Inventors: Göran Larsson, Torslanda (SE); Anders Gunnarsson, Göteborg (SE); Simon Lamarre, Västra Frölunda (SE); Karin Reikerås, Göteborg (SE); Kjell Reikerås, Göteborg (SE); Einar Lenartsson, Sollebrunn (SE); Birgitta Thorsson, Varberg (SE); Åke Bergqvist, Västra Frölunda (SE)

(73) Assignee: AB Volvo, Göteborg (SE)

( * ) Notice: Subject to any disclaimer, the term of this patent is extended or adjusted under 35 U.S.C. 154(b) by 0 days.

(21) Appl. No.: 09/681,883

(22) Filed: Jun. 20, 2001

(65) Prior Publication Data
US 2001/0054522 A1 Dec. 27, 2001

Related U.S. Application Data

(63) Continuation of application No. PCT/SE99/02336, filed on Dec. 14, 1999.

(30) Foreign Application Priority Data

Dec. 21, 1998 (SE) ............................................. 9804469

(51) Int. Cl.⁷ ............................................. B60R 25/02
(52) U.S. Cl. ........................ 180/271; 180/287; 307/10.5
(58) Field of Search ................................ 180/287, 271; 280/775; 340/426; 307/10.2, 10.3, 10.5

(56) References Cited

U.S. PATENT DOCUMENTS

| | | | | |
|---|---|---|---|---|
| 3,032,134 A | * | 5/1962 | Banker ........................ | 280/775 |
| 3,978,740 A | * | 9/1976 | Selzer ......................... | 74/493 |
| 4,673,914 A | * | 6/1987 | Lee ............................. | 180/287 |
| 4,805,722 A | * | 2/1989 | Keating et al. .............. | 180/287 |
| 4,951,776 A | * | 8/1990 | Jeter ........................... | 180/287 |
| 5,091,856 A | * | 2/1992 | Hasegawa et al. ........... | 180/287 |
| 5,519,260 A | * | 5/1996 | Washington ......... | 123/198 DC |
| 5,594,284 A | * | 1/1997 | Hill et al. .................... | 180/287 |
| 5,656,867 A | * | 8/1997 | Kokubu ....................... | 180/287 |
| 5,801,614 A | * | 9/1998 | Kokubu ...................... | 307/10.2 |
| 5,813,699 A | * | 9/1998 | Donner et al. .............. | 280/775 |
| 5,818,330 A | * | 10/1998 | Schweiger ............... | 123/179.2 |
| 5,965,955 A | * | 10/1999 | Takanohashi ................ | 180/287 |
| 6,070,686 A | * | 6/2000 | Pollmann .................... | 180/287 |
| 6,260,651 B1 | * | 7/2001 | Kokubu et al. .............. | 180/287 |
| 6,356,186 B1 | * | 3/2002 | Price et al. .................. | 180/287 |
| 6,380,848 B1 | * | 4/2002 | Weigl et al. ................. | 180/287 |

FOREIGN PATENT DOCUMENTS

| | | |
|---|---|---|
| DE | 3308803 A1 | 9/1984 |
| EP | 0697325 A2 | 2/1996 |
| EP | 0794095 A1 | 9/1997 |
| FR | 2676696 A1 | 11/1992 |
| GB | 2252847 A | 8/1992 |
| JP | 57015022 | * 1/1982 |
| JP | 58110340 | * 6/1983 |
| JP | 63130437 | * 6/1988 |
| WO | WO 9701476 A1 | 1/1997 |

* cited by examiner

*Primary Examiner*—Paul N. Dickson
*Assistant Examiner*—Deanna Draper
(74) *Attorney, Agent, or Firm*—Fitch, Even, Tabin & Flannery

(57) ABSTRACT

A motor vehicle arrangement having a control device for controlling the vehicle. The control device is at least adjustable in the vertical direction. The control device has a parking position in which the vehicle cannot be driven and there is no operative connection for starting, accelerating or braking the vehicle etc. from the operating controls of the vehicle. The control device is releasable from the parking position to a driving position using an authorization verification element which adjusts the driving position. In the driving position, an operative connection is established between the operating control elements of the vehicle and corresponding actuating elements.

15 Claims, 3 Drawing Sheets

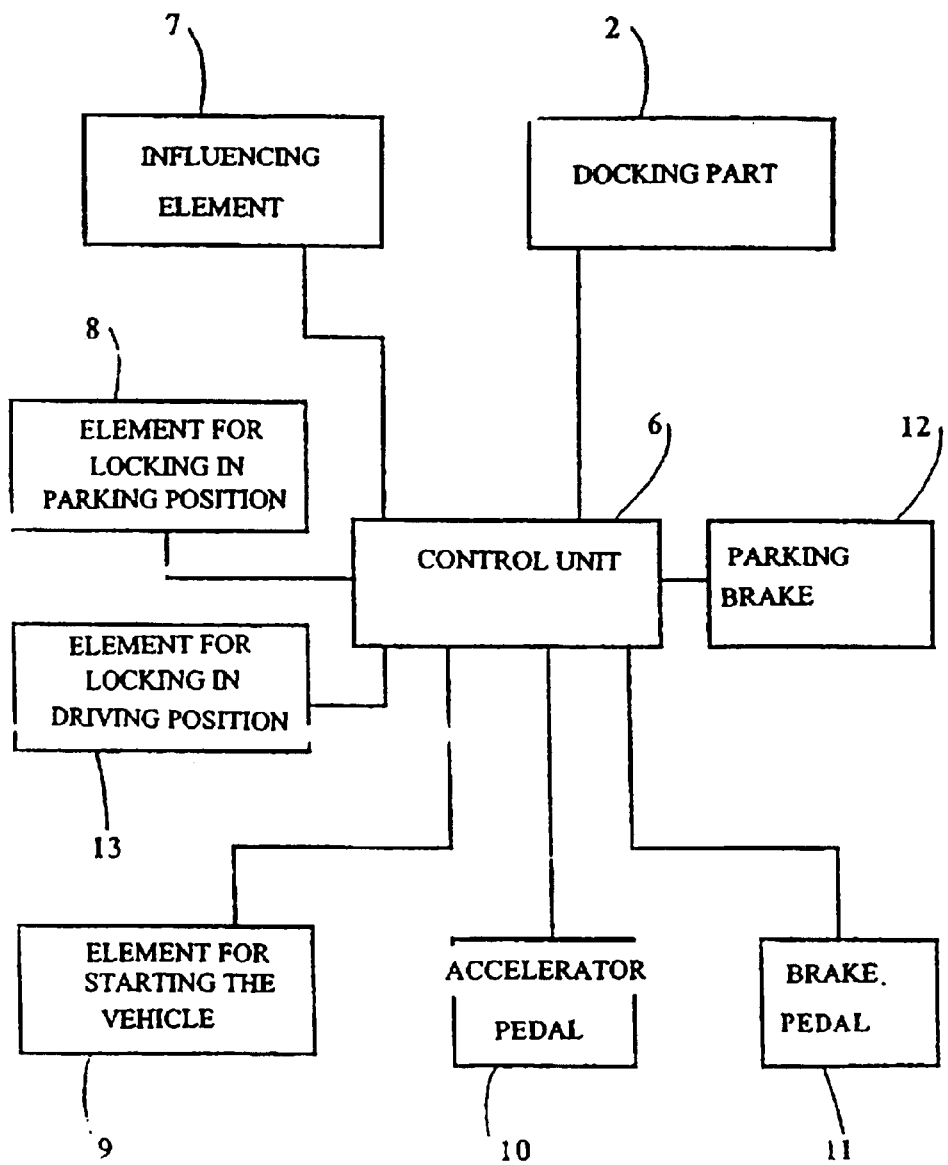

MOTOR VEHICLE ARRANGEMENT

The present application is a continuation of International Application No. PCT/SE99/02336, filed Dec. 14, 1999 and published in English pursuant to PCT Article 21(2), now abandoned, and which claims priority to Swedish Application No. 9804469-6, filed Dec. 21, 1998. The disclosures of both applications are expressly incorporated herein by reference in their entirety.

BACKGROUND OF INVENTION

1. Technical Field

The present invention relates to a motor vehicle arrangement having a device for controlling the vehicle which is adjustable from a parking position to a driving position.

2. Background Information

It is now common for passenger cars to allow for the adjustment of a device for controlling a vehicle, e.g., a steering wheel, to the personal driving position of a driver. Typically, the driver is able to adjust the length of the steering column, the tilt angle and the lateral position of the steering wheel. Once the steering wheel is adjusted to the desired position, e.g., driving position, the steering wheel is locked in place. The ability to adjust the steering wheel into a desired driving position improves the safety and comfort of the driver of the vehicle.

The arrangement according to the present invention has a number of advantages over the prior art. Among other things, it assists in allowing the driver of the vehicle to get in and out of the vehicle in an easier manner. This is achieved by having the steering wheel return to a parking position when the vehicle is parked. In the parking position, the steering wheel is located so that it does not impinge upon the space that is required for getting into and out of the vehicle comfortably. In addition the arrangement is very easy and cheap to implement in electric and hybrid vehicles in which the control signals to and from the actuating elements of the vehicle are electrical. This also applies to electrical control of vehicles of the steer-by-wire type. The arrangement according to the present invention also assists in preventing the vehicle from being stolen. Other features and advantages of the invention will become apparent from the following description of the preferred embodiment.

BRIEF DESCRIPTION OF DRAWINGS

The present invention will be described below on the basis of an illustrative embodiment and with reference to the attached drawings, in which:

FIG. 3 is a block diagram illustrating the interaction between the vehicle control unit or device and different elements which can be attached to the vehicle control unit or device in accordance with an embodiment of the present invention.

DETAILED DESCRIPTION

Figure 1:
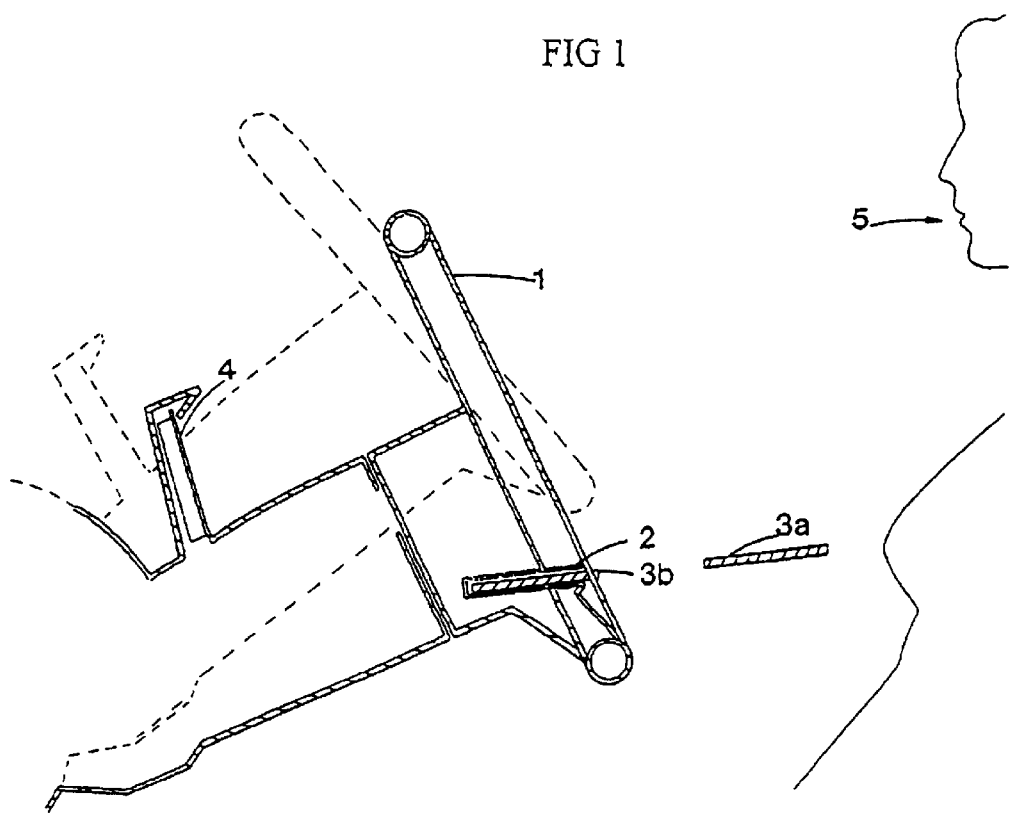
FIG. 1 shows a diagrammatic side view of a vehicle control device in the parking position and in the driving position in accordance with an embodiment of the present invention.

Referring to FIG. 1, a diagrammatic side view of a vehicle control device in the parking position and in the driving position in accordance with an embodiment of the present invention is illustrated. As shown, the control device 1 is adjustable in at least the vertical direction. In some embodiments, the control device 1 the length of the steering column, the tilt angle and the lateral position of the control device 1 are adjustable. The driver 5 is able to adjust the control device 1 from a parking position (illustrated in the dashed lines) to a driving position (illustrated in solid lines). In one embodiment, the control device 1 takes the form of a steering wheel 1. In the parking position the vehicle cannot be driven. In the parking position, the vehicle has no power, therefore there is no operative connection between the elements for starting, accelerating or braking the vehicle etc. and the corresponding actuating elements. The parking position of the steering wheel 1 is a raised position, which makes it easier for a person to get into and out of the vehicle. The steering wheel 1 is designed to be released from the parking position by means of an authorization verification element 3 and moved to a lowered driving position. The authorization verification element is described in more detail below.

The driving position is individually adjustable in that a lowering movement stop is adjustable. In this area many ways of achieving this stop will be obvious to the person skilled in the art. In one embodiment the steering wheel 1 is manually moved into the driving position. In another embodiment, the individual adjustment position is stored on the authorization verification element 3 or in a memory in the vehicle control unit, with the adjustment being linked to an authorization code stored on the authorization verification element 3. Alternatively other data may be stored on the authorization verification element 3, such as seat adjustments. In one embodiment, an operative connection is established between the operating control elements of the vehicle and corresponding actuating elements when the steering wheel 1 is released from the parking position. In another embodiment the connection is established only after the steering wheel 1 is located in the individual driving position.

The steering wheel 1 includes a docking part 2 located adjacent to its hub for receiving the authorization verification element 3. In one embodiment the authorization verification element is a smart card 3. In FIG. 1, the smart card 3 is seen in two positions 3a, 3b. In a first position, e.g., when the steering wheel 1 is in the parking position, the smart card 3a is not docked. In a second position, e.g., when the steering wheel 1 is in the driving position, the smart card 3b is docked in the docking part 2. The smart card 3 has an individual identity or code specific to the motor vehicle. In this way, the steering wheel 1 is retained in the parking position when a smart card 3 is inserted into the docking part 2 that has an identity that does not match that of the vehicle and is released from the parking position when the identity matches that of the vehicle. The docking part 2 has, for example, a spring-loaded arrangement of conventional type, so that when the smart card 3 is pushed in, the smart card 3 is held in the docking part 2 and when the inserted smart card 3 is pressed, the spring-loaded arrangement ejects the smart card 3 from the docking part 2.

Figure 2:
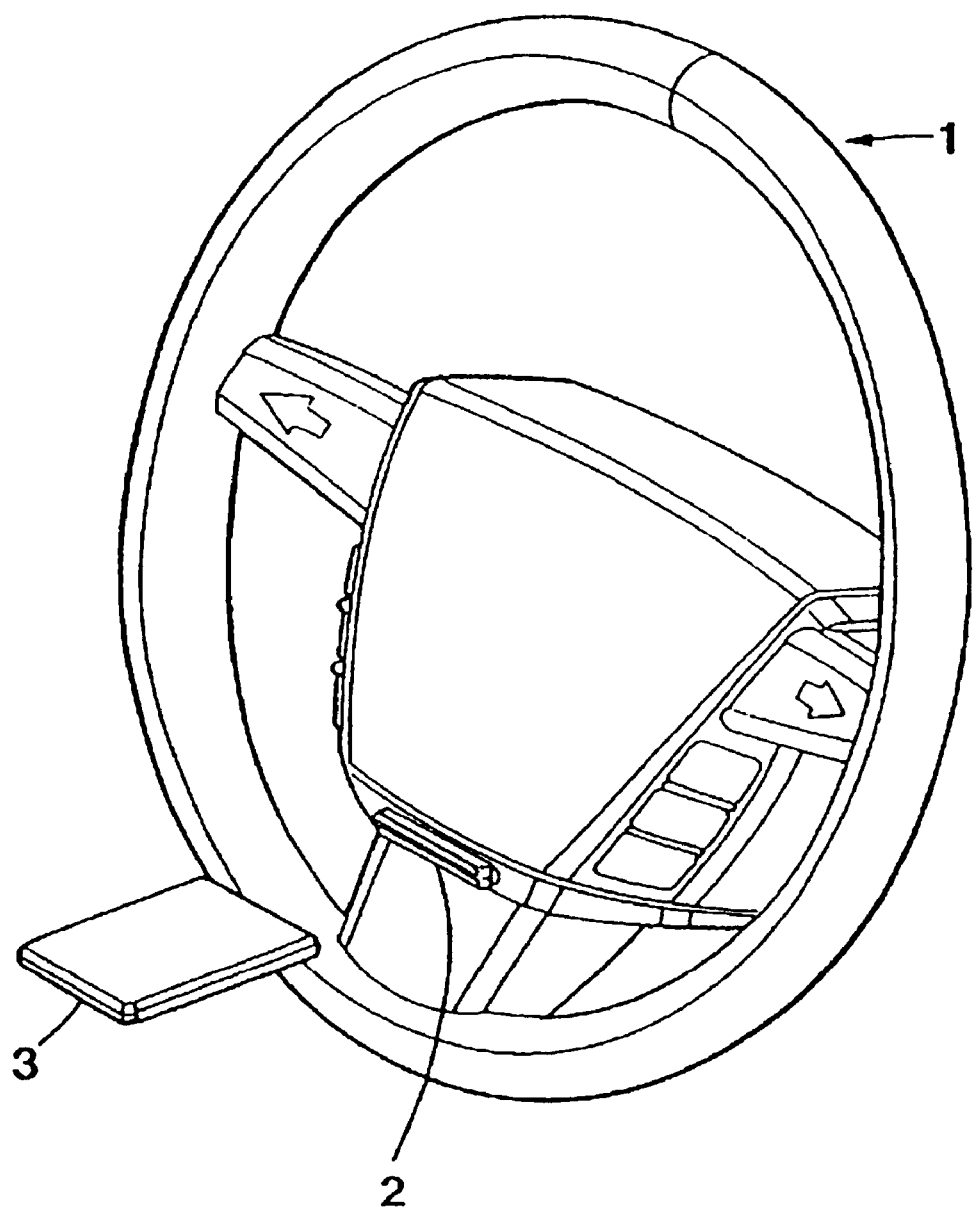
FIG. 2 shows a perspective view of the vehicle control device having a docking part for receiving an authorization verification element in accordance with an embodiment of the present invention.

Referring to FIG. 2, a perspective view of the steering wheel with a docking part for receiving an authorization verification element in accordance with an embodiment of the present invention is illustrated. In the preferred embodiment, the docking part 2 is located on the front face of the steering wheel hub. In an alternate embodiment, the docking part 2 is located on the side of the steering wheel unit. A display unit 4 is arranged adjacent to the steering wheel 1. The display unit 4 is designed to be activated in an individual adjustment position and shows relevant data for driving the vehicle.

Referring to FIG. 3, a block diagram of the interaction between the vehicle control unit or device and different elements which can be attached to the vehicle control unit or device in accordance with an embodiment of the present invention. As illustrated, the control unit 6, e.g., steering wheel 1, is an electrical control unit 6 for controlling, among other things, the connection between the operating control elements of the vehicle and the corresponding actuating elements on the basis of signals from the docking part 2 and an influencing element 7. The control unit 6 is designed to detect the signals from the docking part 2, which indicate whether a smart card 3 is docked in the docking part 2 and whether the identity of the smart card 3 matches the identity of the vehicle. This information is preferably coded, making it impossible to reveal the identity of the vehicle by interrogating the control unit 6.

Until such time as a smart card 3 with the same identity as that of the vehicle is inserted in the docking part 2, the steering wheel 1 is locked in the parking position as described above. This is achieved in that the control unit 6 supplies a signal to the locking element 8 in order to keep the steering wheel 1 in the locked parking position. When a smart card 3 with the correct identity is docked in the docking part 2, the control unit 6 indicates to the locking element 8 to release the steering wheel 1 from the locked parking position. The steering wheel 1 can then be moved for adjustment to the individual driving position for the driver. The driver can adjust the position and move the steering wheel 1 to a desired individual driving position. In one embodiment, the driver confirms by way of an influencing element 7 that the steering wheel 1 is now adjusted to the individual driving position. Once the driver confirms the position, the control unit 6 stores the adjustment and sends a locking signal to locking element 13 for locking the steering wheel 1 in the driving position selected by the driver. In another embodiment there is, for example, a knob is used for manually locking the steering wheel 1 in the driving position. In this embodiment the knob acts in combination with influencing element 7 and locking element 13.

Regardless of what form the influencing element 7 and the locking element 13 take, once confirmed by way of the influencing element 7, operating control elements of the vehicle, such as an element 9 for starting the vehicle, an accelerator pedal 10 and a brake pedal 11, are connected to corresponding actuating elements. In one embodiment the control element 6 is designed to control the vehicle parking brake 12 with the parking brake 12 being activated when the steering wheel 1 is in the parking position and the parking brake 12 being deactivated when the steering wheel 1 is in the individual driving position.

When the driver finishes driving the vehicle, the driver takes the smart card 3 out of the docking part 2, whereupon the control unit 6 releases the locking element 13 locking the steering wheel 1 in the driving position and allowing for the steering wheel 1 to be moved into the parking position. When the steering wheel 1 is in the parking position, the driver has more room to get in and out of the vehicle.

As described above, the smart card 3 has an identity unique to the vehicle. Consequently there may be multiple copies of the smart card 3 in the same way that one has multiple sets of keys for the ignition lock of a vehicle. The smart card 3 can also be provided with means allowing it to be used for locking and unlocking the vehicle doors. With an electrical, sensing locking system at least one door of the vehicle could be automatically unlocked when a smart card 3 with an identity corresponding to the identity of the vehicle is within a certain distance defined by the detection radius of the locking system. In another embodiment, the smart card 3 is personal to the smart cardholder and contains information, among other things, on how the smart cardholder wishes to have information presented on the display 4 or data for automatic adjustment of the steering wheel to the driving position for the smart cardholder.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A motor vehicle arrangement comprising:
    an authorization verification element able to store electronic data thereon; and
    a steering wheel for controlling the vehicle, the steering wheel having an upwardly raised parking position in which the vehicle cannot be driven and an adjustable lowered driving position in which the vehicle can driven, the steering wheel adapted for interacting with the authorization verification element,
    wherein the authorization verification element electronically interacts with the steering wheel to release the steering wheel from the parking position thus allowing the vehicle to be driven.

2. The motor vehicle arrangement according to claim 1 wherein the steering wheel is adjustable at least in the vertical direction when the authorization verification element releases the steering wheel from the parking position.

3. The motor vehicle arrangement according to claim 1 wherein the steering wheel operates electrically.

4. The motor vehicle arrangement according to claim 3 further comprising operative control elements and corresponding actuating elements for starting, accelerating and braking the vehicle, wherein there is no operative connection between the operative elements and corresponding actuating element when the steering wheel is in the parking position.

5. The motor vehicle arrangement according to claim 3 further comprising operative control elements and corresponding actuating elements for starting, accelerating and braking the vehicle, wherein there is operative connection between the operative elements and corresponding actuating element when the steering wheel is in the driving position.

6. The motor vehicle arrangement according to claim 1 wherein the steering wheel is adjustable in tilt angle, length, and laterally.

7. The motor vehicle arrangement according to claim 1 wherein the authorization verification element is a smart card.

8. The motor vehicle arrangement according to claim 7 further comprising a docking part adjacent to the hub of the steering wheel.

9. The motor vehicle arrangement according to claim 7 wherein the docking part is arranged on the front face of the steering wheel hub.

10. The motor vehicle arrangement according to claim 7 wherein the docking part is arranged on the steering wheel hub.

11. The motor vehicle arrangement according to claim 1 wherein the raised parking position of the steering wheel provides additional space for the driver to get in and out of the vehicle.

12. The motor vehicle arrangement according to claim 1 further comprises a display unit designed to be activated in a driving position and to show relevant data for driving of the vehicle.

13. The motor vehicle arrangement according to claim 1 further comprising a parking brake which is activated when the steering wheel is in the parking position.

14. A motor vehicle arrangement comprising:

an authorization verification element, and a control device for controlling the vehicle, the control device having an upwardly raised parking position in which the vehicle cannot be driven and a driving position in which the vehicle can be driven, the control device adapted further comprising a docking part adapted for electronic interaction with the authorization verification element, wherein the authorization verification element interacts with the docking part in the control device to release the control device from the parking position thus allowing the vehicle to be driven.

15. A motor vehicle arrangement comprising:

an authorization verification element, a control device for controlling the vehicle, the control device having an upwardly raised parking position in which the vehicle cannot be driven and a driving position in which the vehicle can be driven, the control device adapted further comprising a docking part adapted for interacting with the authorization verification element, wherein the authorization verification element interacts with the docking part in the control device to release the control device from the parking position thus allowing the vehicle to be driven, and a display unit designed to be activated when the control device is moved from the parking position to the driving position, the display unit showing relevant data for driving the vehicle.

* * * * *